United States Patent
Krpo et al.

(10) Patent No.: US 11,364,819 B2
(45) Date of Patent: Jun. 21, 2022

(54) SLIDING DEVICE FOR A VEHICLE SEAT PROVIDED WITH AN IMPROVED LOCKING ARRANGEMENT

(71) Applicant: MARTUR ITALY S.R.L., Milan (IT)

(72) Inventors: Azra Krpo, Grugliasco (IT); Can Üstünberk, Grugliasco (IT)

(73) Assignee: MARTUR ITALY S.R.L., Milan (IT)

( * ) Notice: Subject to any disclaimer, the term of this patent is extended or adjusted under 35 U.S.C. 154(b) by 0 days.

(21) Appl. No.: 16/618,503

(22) PCT Filed: Apr. 24, 2019

(86) PCT No.: PCT/IB2019/053373
§ 371 (c)(1),
(2) Date: Dec. 2, 2019

(87) PCT Pub. No.: WO2020/003015
PCT Pub. Date: Jan. 2, 2020

(65) Prior Publication Data
US 2020/0406785 A1    Dec. 31, 2020

(30) Foreign Application Priority Data

Jun. 26, 2018    (IT) .................. 102018000006650

(51) Int. Cl.
*B60N 2/08*    (2006.01)
*B60N 2/07*    (2006.01)

(52) U.S. Cl.
CPC ......... *B60N 2/0806* (2013.01); *B60N 2/0722* (2013.01); *B60N 2/0818* (2013.01); *B60N 2/0875* (2013.01); *B60N 2/0881* (2013.01)

(58) Field of Classification Search
USPC .......... 248/424, 429, 419; 296/65.01, 65.02, 296/65.13, 65.11
See application file for complete search history.

(56) References Cited

U.S. PATENT DOCUMENTS 5,596,910 A    1/1997  Bauer et al.
5,782,138 A *  7/1998  Groche ............... B60N 2/0705
                                                248/429
(Continued)

FOREIGN PATENT DOCUMENTS

CN    202686000 U    1/2013
CN    206644678 U    11/2017
(Continued)

OTHER PUBLICATIONS

International Search Report and Written Opinion of the International Searching Authority dated Aug. 21, 2019 for International Patent Application No. PCT/IB2019/053373.

*Primary Examiner* — Alfred J Wujciak
(74) *Attorney, Agent, or Firm* — Howson & Howson LLP

(57) ABSTRACT

The present invention relates to a sliding device for a vehicle seat provided with an improved locking arrangement. Said locking arrangement comprises a pair of locking assemblies (101a, 101b; 201a, 201b), one for each track of the sliding device, each including a plurality of locking pins (105a, 105b; 203a, 203b) suitable for locking the upper rails of the tracks to the respective lower rails. Said locking arrangement further includes a releasing assembly for driving said locking pins to an unlocking configuration for adjusting the position of the vehicle seat. According to the invention, for any selected positions of the vehicle seat, all the locking pins (105a, 105b; 203a, 203b) of the locking assemblies simultaneously or quasi-simultaneously penetrate into corresponding apertures of the lower rails. Therefore, the invention advantageously allows to optimize the locking effect of the locking arrangement, as all the locking pins give their contribution to said locking effect.

9 Claims, 7 Drawing Sheets

(56) References Cited

U.S. PATENT DOCUMENTS

| | | | |
|---|---|---|---|
| 6,637,712 B1* | 10/2003 | Lagerweij | B60N 2/0705 |
| | | | 248/429 |
| 6,772,985 B2 | 8/2004 | Lee | |
| 7,195,303 B2 | 3/2007 | Nihonmatsu et al. | |
| 7,207,541 B2* | 4/2007 | Frohnhaus | B60N 2/0705 |
| | | | 248/424 |
| 7,300,091 B2 | 11/2007 | Nihonmatsu et al. | |
| 7,980,525 B2 | 7/2011 | Kostin | |
| 8,382,057 B2* | 2/2013 | Napau | B60N 2/0881 |
| | | | 248/423 |
| 8,550,420 B2 | 10/2013 | Wojatzki et al. | |
| 8,827,229 B2* | 9/2014 | Wakayama | B60N 2/0893 |
| | | | 248/429 |
| 9,067,514 B2 | 6/2015 | Oh et al. | |
| 9,481,266 B2* | 11/2016 | Kim | B60N 2/0806 |
| 9,545,861 B2* | 1/2017 | Hoppe | B60N 2/0806 |
| 9,604,551 B2* | 3/2017 | Kim | B60N 2/0875 |
| 2003/0006355 A1* | 1/2003 | Horsfield | B60N 2/0715 |
| | | | 248/429 |
| 2008/0120976 A1* | 5/2008 | Kennedy | B60N 2/0875 |
| | | | 60/528 |
| 2010/0102192 A1* | 4/2010 | Tarusawa | B60N 2/0806 |
| | | | 248/429 |
| 2020/0391619 A1 | 12/2020 | Krpo et al. | |
| 2020/0391620 A1 | 12/2020 | Krpo et al. | |
| 2020/0398704 A1 | 12/2020 | Krpo et al. | |
| 2021/0046851 A1 | 2/2021 | Spagnoli et al. | |
| 2021/0053469 A1 | 2/2021 | Spagnoli et al. | |

FOREIGN PATENT DOCUMENTS

| | | |
|---|---|---|
| DE | 10 2004 003144 A1 | 11/2004 |
| JP | 2001-130291 A | 5/2001 |
| KR | 101382117 B1 | 4/2014 |
| TW | M477402 U | 5/2014 |
| WO | 2017/094963 A1 | 6/2017 |

* cited by examiner

SLIDING DEVICE FOR A VEHICLE SEAT PROVIDED WITH AN IMPROVED LOCKING ARRANGEMENT

TECHNICAL FIELD OF THE INVENTION

The present invention relates to a sliding device for a vehicle seat provided with an improved locking arrangement.

More particularly, the present invention relates to a sliding device for a vehicle seat provided with a locking arrangement in which the locking effect ensuring locking between the upper and lower rails of the sliding device is optimized.

PRIOR ART

Vehicle seats generally have a sliding function for pushing or pulling the seat cushion in a forward or backward direction, a height adjustment function for adjusting the height of the seat cushion, and a reclining function for adjusting the inclination of the seat backrest relative to the seat cushion.

The aforesaid sliding function is generally implemented by a sliding device which comprises a pair of parallel tracks, each of which comprises a lower rail attached to the vehicle floor and an upper rail attached to the vehicle seat, the upper rail being constrained to the lower rail, but being able to slide relative to said lower rail.

The sliding device further comprises a locking arrangement for allowing/preventing a movement of the upper rails relative to the lower rails. Such locking arrangement is normally in a locking configuration, in which it prevents the upper rails from sliding with respect to the lower rails, thus avoiding accidental displacements of the seat with respect to the vehicle floor.

Such locking arrangement normally comprises a pair of locking assemblies, one for each track.

The sliding device is further provided with a releasing member which can be used by a user for moving the locking assemblies of the locking arrangement to an unlocking configuration, in which the upper rails are free to move relative to the lower rails, so that the position of the seat with respect to the vehicle floor can be adjusted. Such releasing member can be made, for instance, as a "U"-shaped handle or towel bar having two substantially parallel arms, the end portions of which are configured to simultaneously act upon respective locking assemblies for driving them to their unlocking configuration.

Sliding devices are known from the art in which, in order to provide a positive engagement between the upper and lower rails, the lower rail of each track is provided with a series of apertures, aligned and preferably equally spaced from one another along the longitudinal axis of said lower rail, and each locking assembly is connected to the respective upper rail and comprises one or more locking pins configured to penetrate into respective apertures of the lower rail and engage with the edge of said apertures.

Such locking pins are normally biased, e.g. by means of springs, to a locking configuration, in which at least some of them engage respective apertures of the lower rails.

In order to move the locking assemblies to their unlocking configuration for adjusting the position of the vehicle seat with respect to the vehicle floor, a releasing member—such as a releasing towel bar or handle—is provided, which acts upon respective connecting members, one for each locking assembly: said connecting members, in turn, act upon the locking pins of the respective locking assembly for moving them to an unlocking configuration, in which they are disengaged from the apertures of the respective lower rail. Such locking arrangements for a sliding device for vehicle seats are disclosed, for instance, in documents US 2003/006355, U.S. Pat. Nos. 7,980,525 and 6,637,712.

However, a locking arrangement of the kind disclosed in the aforesaid documents is not free from drawbacks.

In such locking arrangements, each locking assembly includes several locking pins.

In order to allow to lock the upper rails to the lower rails for any position of said upper rails relative to said lower rails, the size of said locking pins, the distance between said locking pins, the size of the apertures in the lower rails and the distance between said apertures are chosen so that at least one locking pin is always aligned with a corresponding aperture, so that it can penetrate into said aperture and engage the edge thereof.

In some known locking arrangements, the size of said locking pins, the distance between said locking pins, the size of the apertures in the lower rails and the distance between said apertures are chosen so that at least a first locking pin is positioned so as to penetrate into a corresponding aperture and engage the forward side of the edge thereof and at least a second locking pin is positioned so as to penetrate into a corresponding window and engage the rearward side of the edge thereof, whereby a "chuckless" engagement is obtained.

However, in order to achieve the above result, in the known locking arrangements the locking pins have to be arranged offset with respect to the apertures in the lower rails, so that, for any position of the upper rails relative to the lower rails, at least one locking pin does not penetrate into a corresponding aperture of the respective lower rail. On the contrary, such locking pin abuts against the lower rail at the web between two adjacent apertures and it does not give any contribution to the locking effect.

In other words, for any position of the upper rails relative to the lower rails, and for any numbers of the locking pins provided in the locking assemblies, the locking effect is not optimized, since only a part of said locking pins gives a contribution to the overall locking effect.

Moreover, in order to achieve the above result, the apertures of the lower rails have to be made as elongated slots, with a length much larger than the diameter of the locking pins (e.g. twice the diameter of the locking pins).

When the locking pins move from their unlocking configuration to their locking configuration, at first only a first pin encounters an aperture of the lower rail and is biased downwardly into said aperture by its spring. However, at this point, there is still some forward and rearward play, since the length of the aperture is larger than the diameter of locking pin, which is free to move inside the aperture until it reaches the edge of said aperture. Only when said pin reaches the edge of the aperture, a second pin becomes aligned with a further aperture and is biased downwardly into said aperture by its spring, thus obtaining the "chuckless" engagement.

In other words, in the known locking arrangements the locking pins do not simultaneously penetrate into respective apertures in the lower rails, so that a kind of intermediate configuration occurs, in which the locking pins have been moved to their locking configuration but there is still a forward and rearward play between the vehicle seat and the vehicle floor.

Document DE 10 2004 003144 discloses a sliding device for a vehicle seat comprising a lower and an upper rails and provided with a locking arrangement which comprises a locking bar associated with the lower rail and three locking pins associated with the upper rail. The locking bar has alternating short and long windows, the short windows having a size which is larger than the thickness of the free end of the locking pins, but smaller than the thickness of such pins in their normal section.

According to the teaching of DE 10 2004 003144, only one of the locking pins is responsible for the play-free locking engagement, i.e. the one which interacts with a short window of the locking bar; the other two locking pins engage in an adjacent long window or in two long windows, which are located on both sides of the short window, so that they do not intervene in the actual locking of the sliding device in normal operation of the motor vehicle. They are required for stopping the locking arrangement in accident-related situations only.

Document U.S. Pat. No. 5,596,910 also discloses a sliding device for a vehicle seat comprising a lower and an upper rails and provided with a locking arrangement which comprises a locking bar associated with the lower rail and three locking pins associated with the upper rail. In the sliding device disclosed in U.S. Pat. No. 5,596,910, too, the locking bar has alternating short and long windows. Document JP 2001-130291 discloses vehicle seat comprising a seat cushion and a seat back, in which a lower part of the seat back is coupled with a connection member slidably supported in the longitudinal direction by a slide rail on a vehicle body side; such connection member is positioned to an arbitrary slide position of the slide rail by fitting a front lock pin and a rear lock pin into respective locking holes. These locking pins allow to bear the bending moment acting onto the seat back in case of collision.

In order to ensure that the locking pins are correctly positioned and they correctly engage the corresponding locking holes, a thin pin is further provided: such thin pin has the function of aligning the locking pins to the respective locking holes and it does not give any contribution in bearing the loads acting on the seat back.

Therefore, the main object of the present invention is to provide a sliding device for a vehicle seat provided with an improved locking arrangement, in which the locking effect is optimized.

More particularly, an object of the present invention is to provide a sliding device for a vehicle seat provided with a locking arrangement of the above-described type, in which all the locking pins of the locking assemblies give a contribution to the locking effect, while ensuring that locking can be achieved for any position of the upper rails relative to the lower rails of the sliding device.

Another object of the present invention is to provide a sliding device for a vehicle seat provided with a locking arrangement of the above-described type, in which all the locking pins of the locking assemblies penetrate simultaneously or quasi-simultaneously into respective apertures of the lower rails.

A further object of the present invention is to provide a sliding device for a vehicle seat provided with a locking arrangement which is compact in size and has a limited number of components, thus improving the locking arrangement reliability.

These and other objects are achieved by a sliding device as claimed in the appended claims.

SUMMARY OF THE INVENTION

The invention relates to sliding device for a vehicle seat which comprises a pair of parallel tracks, each including a lower rail, intended to be attached to the vehicle floor, and an upper rail, intended to be attached to the vehicle seat and slidably mounted to said lower rail, each lower rail comprising a plurality of apertures, aligned and equally spaced from one another along the longitudinal axis of said lower rail.

The sliding device further comprises a locking arrangement which comprises a locking assembly associated to each track for selectively allowing/preventing a movement of said upper rails relative to said lower rails. Each locking assembly is connected to a respective upper rail and comprises a plurality of locking pins configured to penetrate into corresponding apertures of the respective lower rail and to engage the edges of said apertures, said locking pins being biased to a locking configuration, for instance by spring means.

According to the invention, the cross-section of the apertures of the lower rails has substantially the same size and shape of the cross-section of the locking pins and the distance between to adjacent locking pins is substantially equal to the distance between two adjacent apertures of said lower rails or to a multiple of said distance. In this context, the distance between two adjacent locking pins is to be intended as the distance between the longitudinal axes of two adjacent locking pins and the distance between two adjacent apertures as the distance between the longitudinal axes of two adjacent apertures (both measured along the direction of the longitudinal axis of the respective lower rail).

According to the invention, all the apertures of the lower rails substantially have the same size and shape when viewed in cross-section, and all the locking pins correspondingly have substantially the same size and shape when viewed in cross-section.

Thanks to this arrangement, a load (even an intense load in case of collision) acting on the vehicle seat is advantageously distributed in a substantially even way on all the locking pins.

Preferably, the locking pins have a cylindrical body and the apertures in the lower rails are made as circular through-holes, having a diameter substantially equal to the diameter of the locking pins.

Thanks to the above configuration, all the locking pins can penetrate into corresponding apertures of the respective lower rail.

Furthermore, all the locking pins penetrate into corresponding apertures of the respective lower rail simultaneously or quasi-simultaneously.

This allows a load (even an intense load in case of collision) acting on the vehicle seat to be advantageously distributed in a substantially even way on all the locking pins.

It is evident that if the locking pins are aligned to corresponding apertures of the lower rails when they pass from their unlocking configuration to their locking configuration, they can easily penetrate into said apertures.

In order to allow the locking pins to penetrate into corresponding apertures of the lower rails even in case they are offset with respect to the apertures of the lower rails when they pass from their unlocking configuration to their locking configuration, according to the invention at least one locking pin ("master pin") is provided with a rounded tip and, correspondingly, the webs separating adjacent apertures of the lower rails have a convex profile (viewed in direction of the longitudinal axes of the lower rails).

Preferably, said master pin has a frusto-conical tip portion ending with a half spherical tip.

Preferably, said apertures of the lower rails are provided with chamfered edges.

Thanks to this configuration, if the locking pins are offset with respect to corresponding apertures of the lower rails when they pass from their unlocking configuration to their locking configuration, the rounded tip of the master pin slides along the convex profile of the web separating two adjacent apertures of the lower rail towards one of these apertures, so that it is driven into said aperture. The other locking pins ("slave pins") follow the master pin and penetrate into the corresponding apertures of the lower rail immediately afterwards.

Therefore, for any position of the upper rails relative to the lower rails, an optimized locking effect can be achieved, whereby all the locking pins give their contribution to said locking effect as they simultaneously or quasi-simultaneously penetrate into corresponding apertures of the lower rails.

The provision of such a "master pin" allows to eliminate the need for specific means for aligning the locking pins with the respective apertures.

In a preferred embodiment of the invention, the stroke of the master pin is shorter than the strokes of the other locking pins when they pass from their unlocking configuration to their locking configuration, so that the master pin encounters the respective lower rail before the other locking pins.

In another preferred embodiment of the invention, the master pin moves faster than the other locking pins when they pass from their unlocking configuration to their locking configuration, so that the master pin encounters the respective lower rail before the other locking pins.

In an alternative embodiment of the inventions, all the locking pins encounter the respective lower rails at the same time. In such alternative embodiment, all the locking pins have rounded tips, so that they can slide along the convex profiles of respective webs of the lower rails.

BRIEF DESCRIPTION OF THE DRAWINGS

Further features and advantages of the invention will become more evident from the detailed description of some preferred embodiments thereof, given by way of non limiting example, with reference to the attached drawing, in which.

DETAILED DESCRIPTION OF PREFERRED EMBODIMENTS OF THE INVENTION

Figure 1:
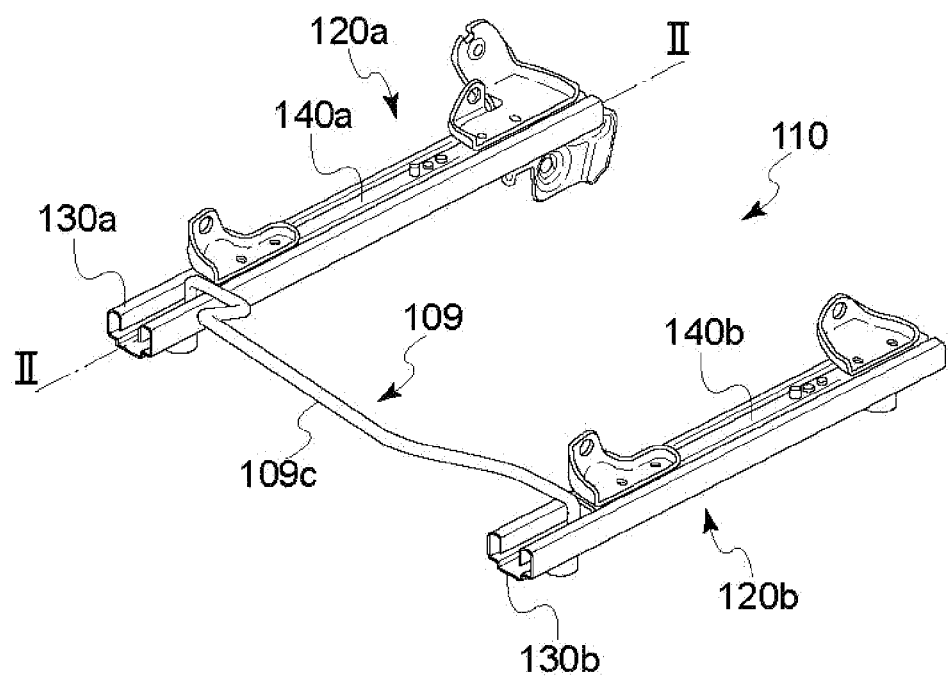
FIG. 1 is a perspective view of a sliding device according to a first preferred embodiment of the invention.

With reference to FIG. 1, a sliding device 110 according to a first embodiment of the invention is shown.

In a per se known manner, the sliding device 110 comprises a pair of parallel tracks 120a, 120b, each comprising a lower rail 130a, 130b, intended to be attached to the vehicle floor, and an upper rail 140a, 140b, intended to be attached to the frame of a vehicle seat. Each upper rail 140a, 140b is constrained to the respective lower rail 130a, 130b, but can slide relative to said lower rail.

In order to selectively allow/prevent a sliding movement of the upper rails relative to the lower rails of the tracks 120a, 120b, a locking arrangement is provided. Said locking arrangement comprises two locking assemblies, one for each tracks 120a, 120b.

Figure 2:
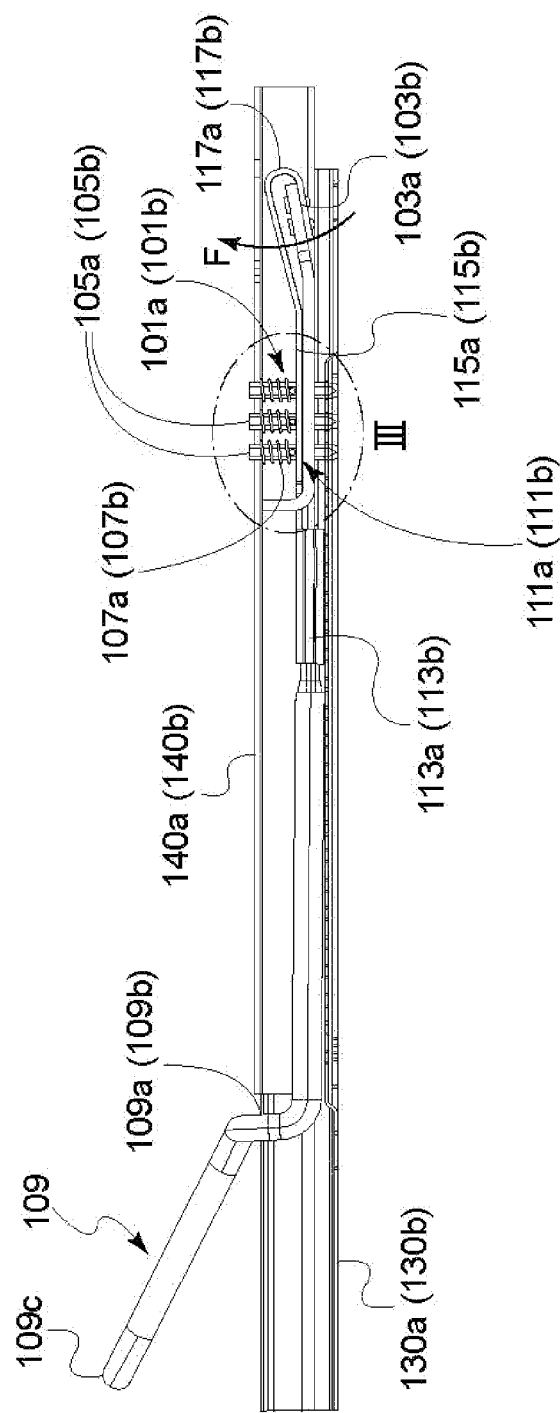
FIG. 2 is a cross-sectional view of the sliding device of FIG. 1 along the line II-II.
Figure 3:
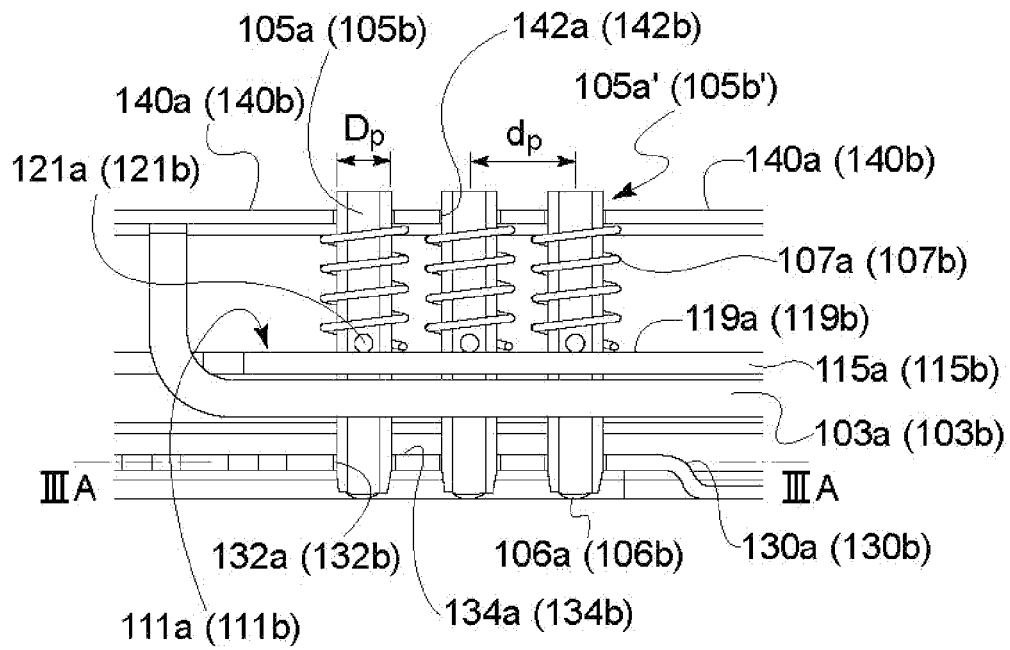
FIG. 3 is an enlarged view of detail III of FIG. 2, illustrated in a first, locking configuration.
Figure 4:
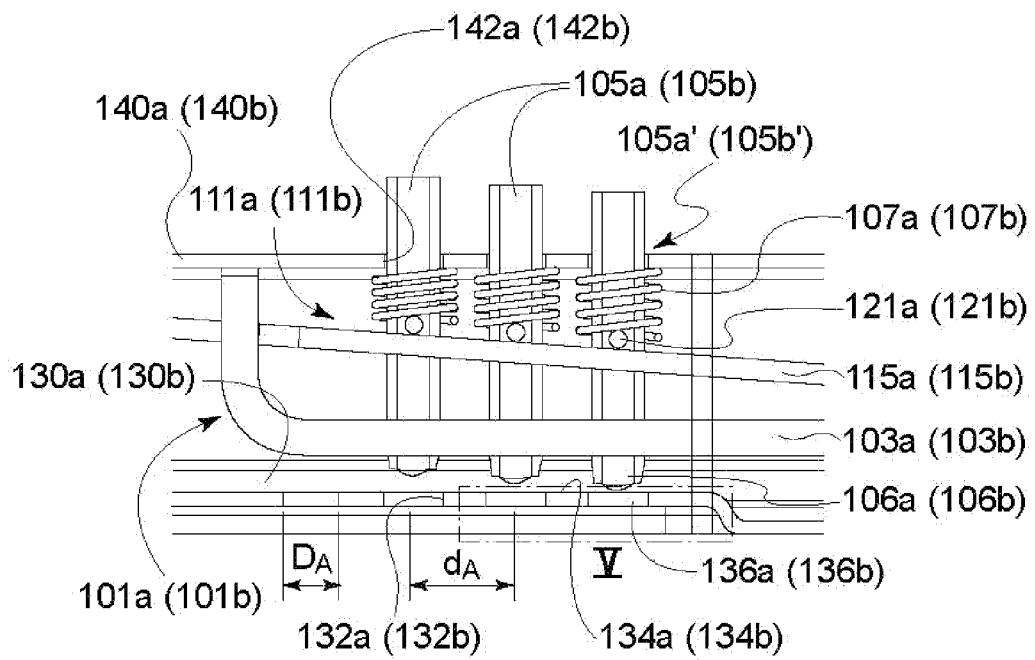
FIG. 4 is an enlarged view of detail III of FIG. 2, illustrated in a second, unlocking configuration.

One of said locking assemblies is shown in FIG. 2-4. It is to be intended that the other locking assembly is identical to the one shown in FIGS. 2-4.

In the shown embodiment, each locking assembly 101a, 101b comprises a support plate 103a, 103b, which is fastened (e.g. welded and/or staked) to the respective upper rail 140a, 140b, and one or more locking pins 105a, 105b (three in the shown embodiment), which are configured to pass through apertures 142a, 142b provided in the respective upper rail 140a, 140b and through a window provided in the support plate 103a, 103b and penetrate into apertures provided in the respective lower rail 130a, 130b for locking the upper rails to the lower rails and preventing any movements of said upper rails relative to said lower rails.

Each of said locking pins 105a, 105b is biased to its locking configuration by a helical spring 107a, 107b, which is wound around the body of each locking pin 105a, 105b and biases such locking pin downwards, towards the lower rail.

In order to allow a user to adjust the position of the seat relative to the vehicle floor, the locking arrangement of the sliding device according to the invention also comprises a releasing assembly for moving the locking pins 105a, 105b from the aforesaid locking configuration to an unlocking configuration, in which all the locking pins are extracted from the apertures of the respective lower rail, thus allowing the upper rails to slide relative to the lower rails.

In general, the releasing assembly comprises a releasing member 109 and a pair of connecting members 111a, 111b, one for each locking assembly 101a, 101b, each connecting member being in a force transmission connection with the releasing member 109, on one hand, and with the locking pins 105a, 105b of the respective locking assembly, on the other hand.

In the shown embodiment, the releasing member is made as a "U"-shaped releasing handle or towel bar 109 comprising a middle gripping portion 109c and two substantially parallel arms 109a, 109b, each penetrating into a respective track 120a, 120b.

Moreover, in the shown embodiment, the connecting members 111a, 111b are entirely received inside the respective tracks 120a, 120b, each of said connecting member being arranged between the upper rail and lower rails of the respective track.

As visible in FIG. 2, in the shown embodiment each connecting member is made as a spring plate 111a, 111b which is arranged above the support plate 103a, 103b of the locking assembly and substantially extends from the rear end of said support plate and projects beyond the front end of said support plate, which is correspondingly provided with a channel for the passage of said spring plate.

The spring plate 111a, 111b comprises an engaging portion 113a, 113b for engaging the respective arm 109a, 109b of the releasing handle 109, a driving portion 115a, 115b for driving the locking pins 105a, 105b of the respective locking assembly 101a, 101b from their locking configuration to their unlocking configuration, and a connecting portion 117a, 117b for connection to the support plate 103a, 103b of the respective locking assembly 101a, 101b.

The driving portion 115a, 115b is made as a flat body, which is arranged above the support plate 103a, 103b of the respective locking assembly and is provided with a window 119a, 119b, which preferably overlies the window of said support plate 103a, 103b, so that the locking pins 105a, 105b can slide through both the window of the support plate 103a, 103b and the window 119a, 119b of the driving portion 115a, 115b of the spring plate 111a, 111b.

As better visible in FIGS. 3 and 4, for allowing the locking pins 105a, 105b to be driven by the spring plate 111a, 111b, such locking pins are provided with transversely projecting pegs 121a, 121b. Preferably, each locking pin 105a, 105b is provided with two diametrically opposed transversely projecting pegs 121a, 121b.

The window 119a, 119b of the driving portion of the spring plate is designed so that its width is larger than the diameter of the locking pins 105a, 105b, but smaller than the sum of the diameter of said locking pins and of the length of the transversely projecting pegs 121a, 121b.

Said transversely projecting pegs 121a, 121b are arranged on the body of the locking pins 105a, 105b so that they are substantially in abutment against the driving portion 115a, 115b of the spring plate 111a, 111b when they are completely inserted into the apertures 132a, 132b of the lower rails 130a, 130b (see FIG. 3).

If the releasing handle 109 is pulled upwards, the spring plate 111a, 111b rotates about a pivot axis at the connecting point with the support plate (see arrow F in FIG. 2) and, consequently, the driving portion 115a, 115b of the spring plate moves upwards and, by overcoming the elastic resistance of the springs 107a, 107b, lifts the locking pins 105a, 105b, thus disengaging them from the apertures 132a, 132b of the lower rails 130a, 130b (see FIG. 4).

Figure 3A:
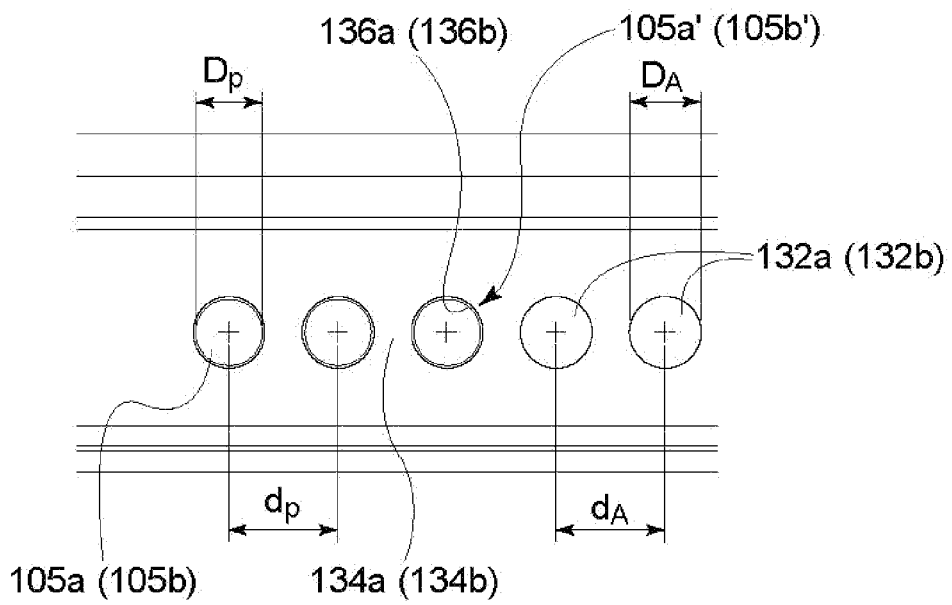
FIG. 3a is a cross-sectional view of FIG. 3 along the line IIIA-IIIA.

As clearly shown in FIG. 3a, according to the invention, all the locking pins 105a, 105b of the locking assemblies penetrate into corresponding apertures 132a, 132b of the lower rails 130, 130b when they are moved to their locking configuration.

Advantageously, the locking effect is therefore optimized, as all the locking pins 105a, 105b give their contribution to such locking effect.

For obtaining the aforesaid result, the locking pins 105a, 105b have a cylindrical body and the apertures 132a, 132b are made as circular through-holes, having a diameter $D_A$ substantially equal to the diameter Dr of the locking pins 105a, 105b and the distance $d_P$ between the longitudinal axes of two adjacent locking pins is substantially equal to the distance $d_A$ between the longitudinal axes of two adjacent apertures of the lower rail or to a multiple of said distance.

In the preferred embodiment shown in the Figures, the distance $d_P$ between the longitudinal axes of two adjacent locking pins 105a, 105b is substantially equal to the distance $d_A$ between the longitudinal axes of two adjacent apertures 132a, 132b of the lower rail, so that the locking pins penetrate into adjacent apertures.

In order to ensure that the locking pins 105a, 105b penetrate into corresponding apertures 132a, 132b of the lower rails for any positions of the upper rails relative to the lower rails, at least one locking pin, i.e. a master pin 105a', 105b', is provided with a rounded tip 106a, 106b; correspondingly, the webs 134a, 134b separating adjacent apertures of the lower rails have a convex profile (viewed in direction of the longitudinal axes of the lower rails).

Preferably, said master pin 105a', 105b' is provided with a frusto-conical tip portion ending with a spherical tip 106a, 106b.

Figure 5:
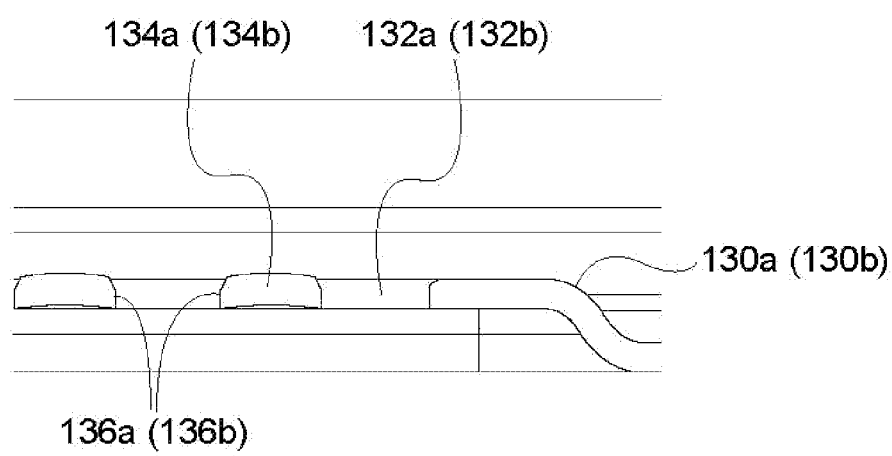
FIG. 5 is an enlarged view of detail V of FIG. 4.

In addition, said apertures 132a, 132b of said lower rails are preferably provided with chamfered edges 136a, 136b, as also clearly visible in FIG. 5.

The master pin 105a', 105b' is the locking pin that first encounters the respective lower rail when the locking pins are moved from their unlocking configuration to their locking configuration.

As clearly visible from FIG. 4, in the shown embodiment, due to the structure and operation of the spring plate 111a, 111b, the stroke of the rearmost locking pin is shorter than the strokes of the other locking pins when said locking pins are moved from their unlocking configuration to their locking configuration.

Accordingly, said rearmost locking pin is selected as master pin 105a', 105b' and is made with a rounded tip 106a, 106b.

The operation of the locking arrangement of the sliding device according to the shown embodiment of invention can be summarized as follows.

In a rest condition, the springs 107a, 107b bias the locking pins 105a, 105b of the locking assemblies 101a, 101b towards the apertures 132a, 132b of the lower rails 130a, 130b and all said locking pins penetrate into corresponding apertures of the respective lower rail. In such a locking configuration, the upper rails 140a, 140b cannot slide relative to the lower rails 130a, 130b (see FIG. 3).

When a user wishes to adjust the position of the vehicle seat relative to the vehicle floor, he/she applies a force to the releasing handle 109, by pulling the middle gripping portion 109c of said handle upwards.

As a result, the spring plate 111a, 111b is also pulled upwards and it rotates about the connecting point to the supporting plate 103a, 103b (see arrow F in FIG. 2). More particularly, the driving portion 115a, 115b of the spring plate moves upwards and the edge of the window 119a, 119b engages the transversely projecting pegs 121a, 121b of the locking pins 105a, 105b. By overcoming the elastic resistance of the springs 107a, 107b, the driving portion 115a, 115b of the spring plate lifts the locking pins 105a, 105b, so that they move upwards (guided by the apertures 142a, 142b of the respective upper rail) until they become disengaged from the apertures 132a, 132b of the respective lower rail 30a, 30b. In such an unlocking configuration, the upper rails 140a, 140b can slide relative to the lower rails 130a, 130b and the position of the vehicle seat can be adjusted (see FIG. 4).

When the user sets the new, desired position of the vehicle seat and releases the releasing handle 109, the springs 107a, 107b bias the locking pins 105a, 105b back towards the apertures of the respective lower rail 130a, 130b:
- if in the aforesaid new position of the vehicle seat, i.e. in the new position of the upper rails 140a, 140b relative to the lower rails 130a, 130b, the locking pins 105a, 105b are aligned with corresponding apertures 132a, 132b of the lower rails, all said locking pins will easily penetrate into said apertures;
- if in the aforesaid new position of the vehicle seat, the locking pins 105a, 105b are offset with respect to corresponding apertures 132a, 132b of the lower rails, the rearmost (master) locking pin 105a', 105b' will first abut against a web 134a, 134b separating two adjacent apertures and the tip 106a, 106b of said locking pin will slide (under the action of its spring) along the convex profile of said web 134a, 134b towards one of said apertures and then it will be driven into said aperture along the chamfered edge 136a, 136b thereof; due to the size and arrangement of the locking pins and of the apertures in the lower rails, the other locking pins ("slave pins") will penetrate into corresponding, adjacent apertures 132a, 132b of the lower rail immediately after the master pin.

Therefore, for any selected position of the vehicle seat, i.e. of the upper rails 140a, 140b relative to the lower rails 130a, 130b, all the locking pins 105a, 105b will quasi-simultaneously penetrate into corresponding apertures 132a, 132b of the lower rails 130a, 130b, thus optimizing the locking effect.

Figure 6:
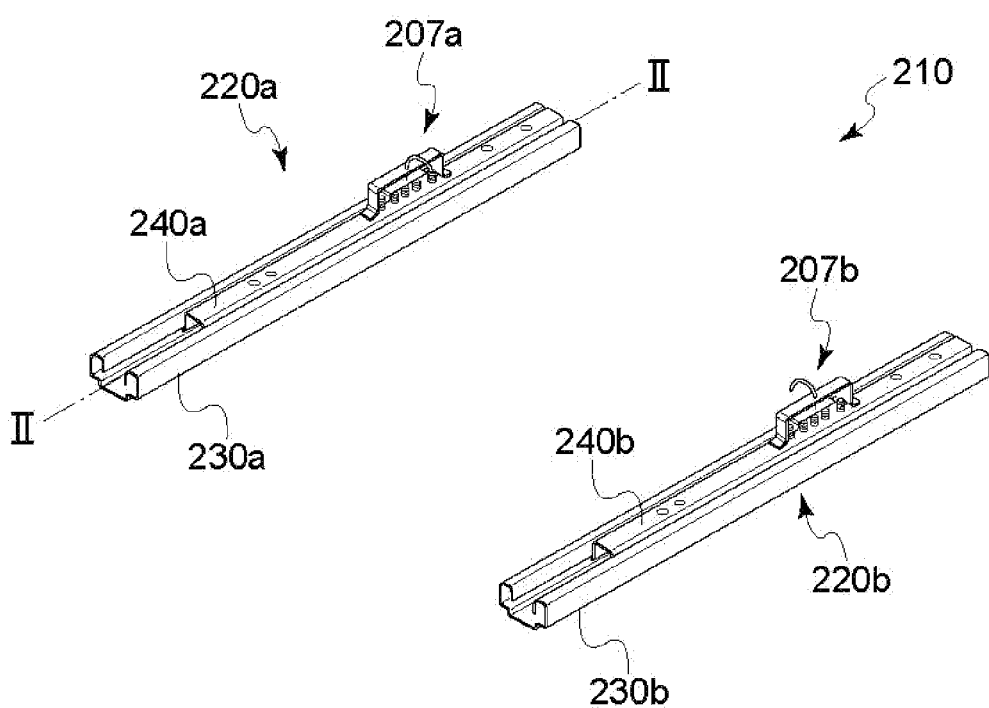
FIG. 6 is a perspective view of a sliding device according to a second preferred embodiment of the invention.

With reference to FIG. 6, a sliding device 210 according to a second embodiment of the invention is shown.

In this embodiment, too, the sliding device 210 comprises a pair of parallel tracks 220a, 220b, each comprising a lower rail 230a, 230b, intended to be attached to the vehicle floor, and an upper rail 240a, 240b, intended to be attached to the frame of a vehicle seat, each upper rail 240a, 240b being constrained to the respective lower rail 230a, 230b, but able to slide relative to said lower rail.

In this embodiment, too, a locking arrangement comprising two locking assemblies, one for each tracks 220a, 220b is provided.

Figure 7:
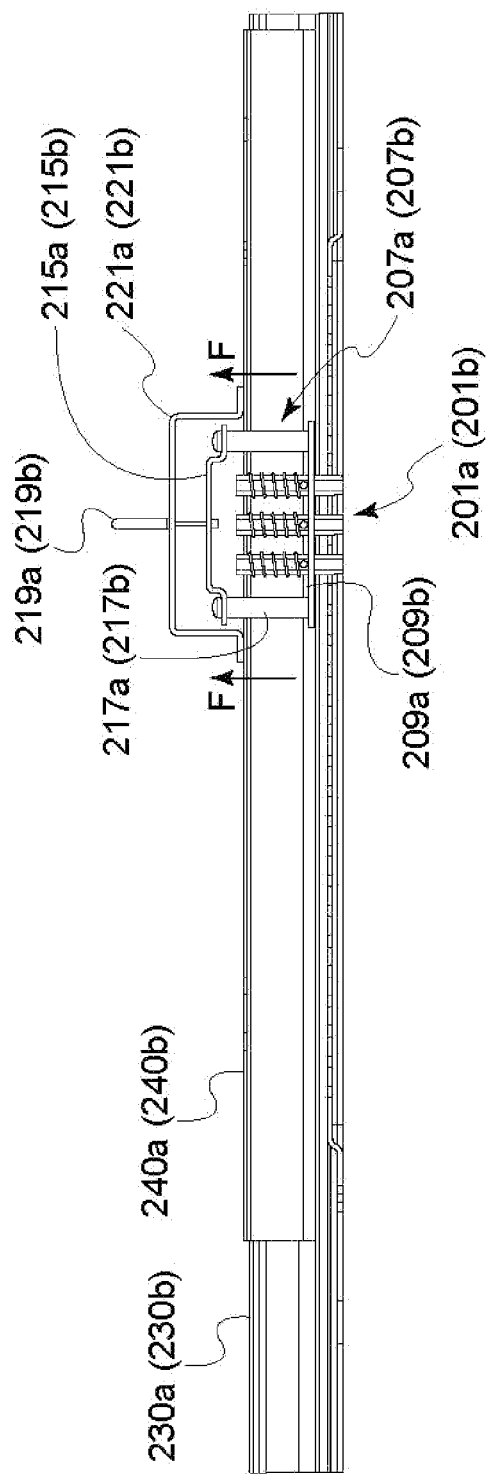
FIG. 7 is a cross-sectional view of the sliding device of FIG. 6 along the line VII-VII.
Figure 8:
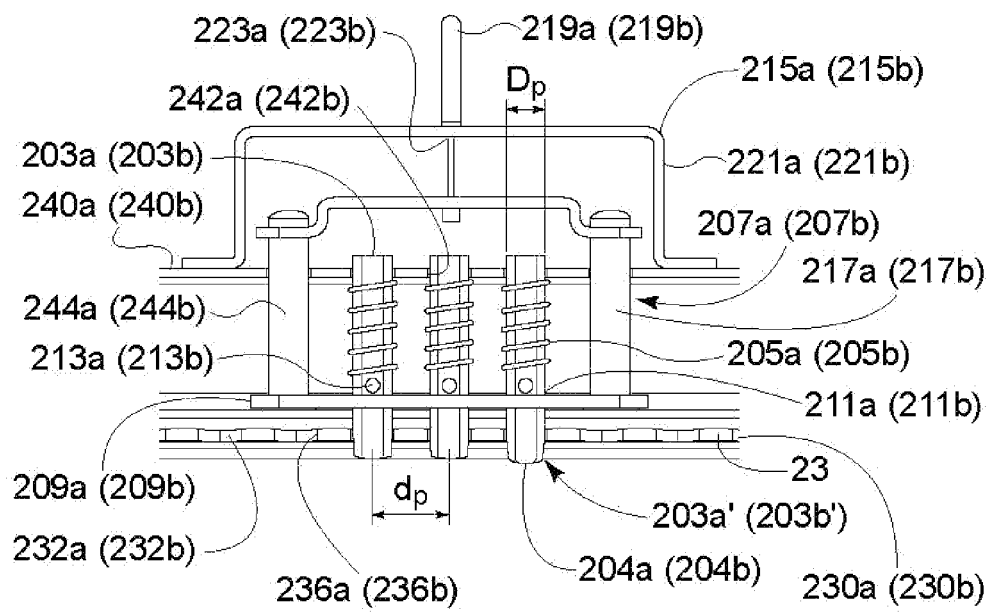
FIG. 8 is an enlarged view of detail VIII of FIG. 7, illustrated in a first, locking configuration.
Figure 9:
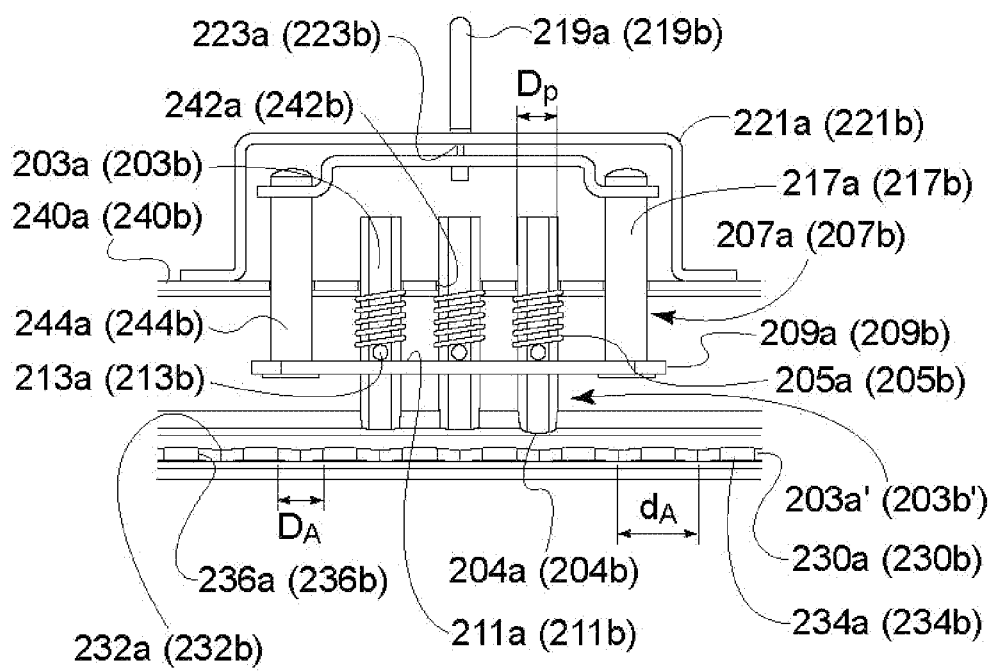
FIG. 9 is an enlarged view of detail VIII of FIG. 7, illustrated in a second, unlocking configuration.

One of said locking assemblies is shown in FIGS. 7-9. It is to be intended that the other locking assembly is identical to the one shown in FIGS. 7-9.

Each locking assembly 201a, 201b comprises a plurality of locking pins 203a, 203b (three in the shown embodiment), which are configured to pass through apertures 242a, 242b provided in the respective upper rail 240a, 240b and penetrate into apertures provided in the respective lower rail 230a, 230b for locking the upper rails to the lower rails and preventing any movements of said upper rails relative to said lower rails.

As in the previously described embodiment, the locking pins 203a, 203b are biased to their locking configuration by helical springs 205a, 205b wound around the body of said locking pins 203a, 203b.

In this embodiment, too, the locking arrangement of the sliding device comprises a releasing assembly for moving the locking pins 203a, 203b from the aforesaid locking configuration to an unlocking configuration, said releasing assembly comprising a releasing member (not shown) and a pair of connecting members 207a, 207b, one for each locking assembly 201a, 201b, each connecting member being in a force transmission connection with the releasing member, on one hand, and with the locking pins 203a, 203b of the respective locking assembly, on the other hand.

In this embodiment, the connecting members 207a, 207b are configured to slide along a substantially linear path and to accordingly drive the locking pins 203a, 203b along a substantially linear path for moving such locking pins from their locking configuration to their unlocking configuration, and vice versa.

To this purpose, in the shown embodiment each connecting member 207a, 207b comprises an engaging plate 209a, 209b arranged between the respective upper and lower rails and provided with a window 211a, 211b, through which the locking pin 203a, 203b are configured to pass.

In order to allow the locking pins 203a, 203b to be driven by the engaging plate 209a, 209b, such locking pins are provided with transversely projecting pegs 213a, 213b. Preferably, each locking pin 203a, 203b is provided with two diametrically opposed transversely projecting pegs 213a, 213b.

Said transversely projecting pegs 213a, 213b are arranged on the body of the locking pins 203a, 203b so that they are substantially in abutment against the engaging plate 209a, 209b when said locking pins are completely inserted into the apertures 232a, 232b of the lower rails 230a, 230b (locking configuration).

Correspondingly, the window 211a, 211b of the engaging plate is designed so that its width is larger than the diameter of the locking pins 203a, 203b, but smaller than the sum of the diameter of said locking pins and of the length of the transversely projecting pegs 213a, 213b, so that the edge of this window can engage the transversely projecting pegs 213a, 213b and lifting the locking pins 203a, 203b until they become disengaged from the apertures 232a, 232b of the lower rails 230a, 230b.

In order to confer high stiffness to the connecting members 207a, 207b, each connecting member further comprises a second plate, i.e. a lifting plate 215a, 215b, which is arranged outside the respective track, above the respective upper rail, is substantially parallel to the engaging plate 209a, 209b and is connected to said engaging plate by means of connecting studs 217a, 217b passing through through-holes 244a, 244b provided in the upper rails 240a, 240b.

Each connecting member 207a, 207b further includes a connecting element 219a, 219b for connection to the releasing member, such connecting element being preferably made as a wire or cable 219a, 219b, such as a Bowden cable.

In order to further enhance the stiffness of the connecting members 207a, 207b, a bracket 221a, 221b is fixedly fastened to the upper rail 240a, 240b of each track of the sliding device, and the cable 219a, 219b passes through an opening 223a, 223b provided in said fixed bracket 221a, 221b.

If the cable 219a, 219b is pulled upwards, the engaging plate 209a, 209b moves upwards and, by overcoming the elastic resistance of the springs 205a, 205b, lifts the locking pins 203a, 203b, thus disengaging them from the apertures 232a, 232b of the lower rails 230a, 230b (see FIG. 9).

In this embodiment, too, the locking pins 203a, 203b have a cylindrical body and the apertures 232a, 232b are made a circular through-holes, having a diameter $D_A$ substantially equal to the diameter $D_P$ of the locking pins 203a, 203b, and the distance dr between the longitudinal axes of two adjacent locking pins is substantially equal to the distance $d_A$ between the longitudinal axes of two adjacent apertures of the lower rail so that all the locking pins 203a, 203b of the locking assemblies penetrate into corresponding, adjacent apertures 232a, 232b of the lower rails 230a, 230b when they are moved to their locking configuration.

In order to ensure that the locking pins 203a, 203b penetrate into corresponding apertures 232a, 232b of the lower rails for any positions of the upper rails relative to the lower rails, at least one locking pin, i.e. a master pin 203a', 203b', is provided with a rounded tip 204a, 204b; correspondingly, the webs 234a, 234b separating adjacent apertures of the lower rails have a convex profile (viewed in direction of the longitudinal axes of the lower rails) and said apertures 232a, 232b are preferably provided with chamfered edges 236a, 236b.

The master pin 203a', 203b' is the locking pin that first encounters the respective lower rail when the locking pins are moved from their unlocking configuration to their locking configuration. In this embodiment, as the stroke of all the locking pins is the same, the master pin 203a', 203b' is made to move slightly faster than the other locking pins, for instance by biasing it with a spring stronger than the spring of the other locking pins.

The operation of the locking arrangement of the sliding device according to the invention can be summarized as follows.

With particular reference to FIG. 8, in a rest condition, the springs 205a, 205b bias the locking pins 203a, 203b of the locking assemblies 201a, 201b towards the apertures 232a, 232b of the lower rails 30a, 30b. In such locking configuration, the upper rails 240a, 240b cannot slide relative to the lower rails 30a, 30b.

When a user wishes to adjust the position of the vehicle seat relative to the vehicle floor, he/she applies a force to the releasing member, thus pulling the cables 219a, 219b of the connecting members 207a, 207b. As a result, as shown in FIG. 9, the engaging plates 209a, 209b of the connecting members 207a, 207b are pulled upwards (see arrows F in FIG. 7) and, by overcoming the elastic resistance of the springs 205a, 205b, lift said locking pins 203a, 203b, until they become disengaged from the apertures 232a, 232b of the respective lower rail 230a, 230b.

In such an unlocking configuration, the upper rails 240a, 240b can slide relative to the lower rails 230a, 230b and the position of the vehicle seat can be adjusted.

When the user sets the new, desired position of the vehicle seat and releases the releasing member, the springs 205a, 205b bias the locking pins 203a, 203b back towards the apertures of the respective lower rail 230a, 230b:
- if in the aforesaid new position of the vehicle seat, the locking pins 203a, 203b are aligned with corresponding apertures 232a, 232b of the lower rails, all said locking pins will easily penetrate into said apertures;
- if in the aforesaid new position of the vehicle seat, the locking pins 203a, 203b are offset with respect to corresponding apertures 232a, 232b of the lower rails, the master locking pin 203a', 203b' (moving faster than the other locking pins) will first abut against a web 234a, 234b separating two adjacent apertures and the tip 204a, 204b of said locking pin will slide (under the action of its spring) along the convex profile of said web 234a, 234b towards one of said apertures and then it will be driven into said aperture along the chamfered edge 236a, 236b thereof; due to the size and arrangement of the locking pins and of the apertures in the lower rails, the other locking pins ("slave pins") will penetrate into corresponding, adjacent apertures 232a, 232b of the lower rail immediately after the master pin.

Therefore, for any selected position of the vehicle seat, all the locking pins 203a, 203b will quasi-simultaneously penetrate into corresponding apertures 232a, 232b of the lower rails 230a, 230b, thus optimizing the locking effect.

A further alternative embodiment can be envisaged, in which the stroke of all the locking pins is the same and all the locking pins move at the same speed.

In such embodiment, all the locking pins are provided with rounded tips. Accordingly, if the locking pins are offset with respect to corresponding apertures of the lower rails when they are moved from their unlocking configuration to their locking configuration, they will simultaneously abut against corresponding webs of the respective lower rail and their rounded tips will slide along the convex profiles of said webs so that they will be simultaneously driven into respective apertures of said lower rail.

The above description of preferred embodiments of the invention has been given merely by way of example and several variants and modifications within the reach of the person skilled in the art can be envisaged, without departing from the scope of the invention as defined by the appended claims.

More particularly, although three locking pins are provided in the shown embodiment, the locking assemblies could also include a different number of locking pins, namely a higher number of locking pins (e.g. four). Locking assemblies with a higher number of locking pins are particularly suitable for applications in which high loads are involved.

The invention claimed is:

1. A sliding device for a vehicle seat, comprising a pair of parallel tracks, each comprising a lower rail and an upper rail, each of the upper rails being constrained to a respective lower rail, but slidable relative to the lower rail, wherein the lower rails and the upper rails have respective longitudinal axes, wherein the lower rails are provided with a plurality of apertures arranged along the longitudinal axes of the lower rails, wherein the sliding device is provided with a locking arrangement including two locking assemblies, one for each of the tracks, wherein each locking assembly comprises a plurality of locking pins, which are configured to move from a locking configuration, in which they penetrate into corresponding apertures of the respective lower rail, to an unlocking configuration, in which they are disengaged from the apertures of the lower rail, and vice versa, wherein all the locking pins simultaneously or quasi-simultaneously penetrate into corresponding apertures of the lower rails when they are moved from the unlocking configuration to the locking configuration, wherein the cross-section of the apertures of the lower rails substantially has the same shape and size of the cross-section of the locking pins, wherein the distance between two adjacent locking pins is substantially equal to the distance between two adjacent apertures or to a multiple thereof, and wherein all the apertures of the lower rails substantially have the same shape and size when viewed in cross-section, and wherein all the locking pins substantially have the same shape and size when viewed in cross-section, and wherein adjacent apertures of the lower rails are separated by corresponding webs having a convex profile in a direction of the longitudinal axes of the lower rails, and wherein at least one of the locking pins is provided with a rounded tip.

2. The sliding device according to claim 1, wherein the apertures of the lower rails are made as circular through-holes and the locking pins have a cylindrical body, wherein all the apertures of the lower rails have the same diameter and all the locking pins of the locking assemblies have the same diameter, and wherein the diameter of the apertures of the lower rails is substantially equal to the diameter of the locking pins.

3. The sliding device according to claim 1, wherein the locking assemblies are configured such that a stroke of the at least one of the locking pins is shorter than a stroke of the other locking pins when the locking pins are moved from their unlocking configuration to their locking configuration.

4. The sliding device according to claim 1, wherein the locking assemblies are configured such that the at least one of the locking pins moves faster than the other locking pins when the locking pins are moved from their unlocking configuration to their locking configuration.

5. The sliding device according to claim 1, wherein all the locking pins are provided with a rounded tip.

6. The sliding device according to claim 1, wherein the at least one of the locking pins is provided with a frusto-conical tip portion ending with a half spherical tip.

7. The sliding device according to claim 1, wherein the apertures of the lower rails are provided with chamfered edges.

8. The sliding device according to claim 1, wherein the locking pins are biased towards the apertures of the lower rails by means of springs.

9. A sliding device for a vehicle seat, comprising:
- a first track parallel to a second track, the first track including a lower rail and an upper rail, the upper rail of the first track being constrained to the lower rail of the first track, but slidable relative thereto along a longitudinal axis of the first track, and the lower rail of the first track having a plurality of apertures arranged along the longitudinal axis of the first track, and the second track including a lower rail and an upper rail, the upper rail of the second track being constrained to the lower rail of the second track, but slidable relative thereto along a longitudinal axis of the second track, and the lower rail of the second track having a plurality of apertures arranged along the longitudinal axis of the second track; and
- a locking arrangement including a first locking assembly interconnected to the first track and a second locking assembly interconnected to the second track;
- the first locking assembly having a plurality of locking pins which are configured to move from a locking configuration, in which all of the plurality of locking pins of the first locking assembly penetrate into corresponding apertures of the lower rail of the first track, to an unlocking configuration, in which all of the plurality of locking pins of the first locking assembly are disengaged from the apertures of the lower rail of the first track, and vice versa, such that all of the plurality of locking pins of the first locking assembly simultaneously or quasi-simultaneously penetrate into the corresponding apertures of the lower rail of the first track when the plurality of locking pins of the first locking assembly are moved from the unlocking configuration to the locking configuration;
- the second locking assembly having a plurality of locking pins which are configured to move from a locking configuration, in which all of the plurality of locking pins of the second locking assembly penetrate into corresponding apertures of the lower rail of the second track, to an unlocking configuration, in which all of the plurality of locking pins of the second locking assembly are disengaged from the apertures of the lower rail of the second track, and vice versa, such that all of the plurality of locking pins of the second locking assembly simultaneously or quasi-simultaneously penetrate into the corresponding apertures of the lower rail of the second track when the plurality of locking pins of the second locking assembly are moved from the unlocking configuration to the locking configuration;
- wherein each of the apertures of the lower rails of the first and second tracks is a circular through-hole having chamfered edges and being of a predetermined diameter and each of the locking pins of each of the plurality of locking pins of the first and second locking assemblies has a cylindrical body with a predetermined diameter such that all the apertures of the lower rails have the same predetermined diameter, all the locking pins of the first and second locking assemblies have the same predetermined diameter, and the predetermined diameter of the apertures is substantially equal to the predetermined diameter of the locking pins, and such that a distance between two adjacent locking pins within the first locking assembly is substantially equal to the distance between two adjacent apertures of the lower rail of the first track or to a multiple thereof, and the distance between two adjacent locking pins within the second locking assembly is substantially equal to the distance between two adjacent apertures of the lower rail of the second track or to a multiple thereof;
- wherein adjacent apertures of the lower rail of the first track are separated by corresponding webs having a convex profile in a direction of the longitudinal axis of the first track, and wherein adjacent apertures of the lower rail of the second track are separated by corresponding webs having a convex profile in a direction of the longitudinal axis of the second track; and
- wherein at least one of the locking pins of the plurality of locking pins of the first locking assembly has a rounded tip and at least one of the locking pins of the plurality of locking pins of the second locking assembly has a rounded tip.

* * * * *